(12) United States Patent
Janssen et al.

(45) Date of Patent: Mar. 15, 2005
(10) Patent No.: US 6,865,794 B2

(54) ALIGNMENT TOOL, ASSEMBLY TOOL AND METHOD FOR A POLY-PLANE WORKPIECE

(75) Inventors: Peter J. Janssen, Scarborough, NY (US); Grant J. McCloud, Paramus, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 159 days.

(21) Appl. No.: 10/157,663

(22) Filed: May 29, 2002

(65) Prior Publication Data

US 2003/0221304 A1 Dec. 4, 2003

(51) Int. Cl.[7] .............................. B23Q 3/00; B25B 27/14
(52) U.S. Cl. .......................................... 29/464; 29/281
(58) Field of Search .......................... 29/281.1, 281.5, 29/240, 464, 466, 468, 469, 428, 460; 348/196, 756

(56) References Cited

U.S. PATENT DOCUMENTS

| | | | |
|---|---|---|---|
| 5,410,370 A | 4/1995 | Janssen | 348/756 |
| 5,416,514 A | 5/1995 | Janssen et al. | 348/196 |
| 6,158,970 A | * 12/2000 | Ota et al. | 417/222.2 |

* cited by examiner

*Primary Examiner*—John C. Hong

(57) ABSTRACT

Tools and method for aligning a first polyhedral workpiece with a central axis and for joining the first workpiece with a second workpiece also aligned with the central axis. The aligning tool includes two sets of urging members offset from one another along the central axis of the first workpiece, each set including urging members biased to urge the first workpiece in a direction transverse to the central axis and opposite from the bias direction of the other set. The invention is useful for example in aligning and joining a rotatable prism to a rotor.

13 Claims, 5 Drawing Sheets

US 6,865,794 B2

ALIGNMENT TOOL, ASSEMBLY TOOL AND METHOD FOR A POLY-PLANE WORKPIECE

BACKGROUND OF THE INVENTION

This invention relates to tools and methods for aligning and assembling workpieces, and more particularly relates to such tools and methods for aligning and assembling a poly-plane workpiece and a base member along their central axes.

A single panel scrolling color projection display system is characterized by a single light modulator panel such as a liquid crystal display (LCD) panel having a raster of individual picture elements or pixels, which panel is illuminated by horizontally elongated red, green and blue illumination bars or stripes. The stripes are continuously scrolled vertically across the panel while the illuminated rows of pixels are synchronously addressed with display information corresponding to the color of the then incident stripe. See, for example, U.S. Pat. No. 5,410,370, "Single panel color projection video display improved scanning" issued to P. Janssen on Mar. 25, 1994, and U.S. Pat. No. 5,416,514, "Single panel color projection video display having control circuitry for synchronizing the color illumination system with reading/writing of the light valve" issued to P. Janssen et al. on May 16, 1995.

Light engines for such single-panel color projection display systems commonly utilize spinning prisms to generate the scrolling illumination bars or stripes. These prisms typically are polyhedrons having four plane sides substantially parallel to a central axis of rotation, and a square cross-section. Although the prisms must be centered with great precision to the axis of rotation of the scanner motor, this is difficult in practice due to the large dimensional tolerances associated with a low-cost manufacturing process.

This centering is presently carried out by clamping the prism into the chuck of a lathe, measuring the (lateral) runout, adjusting the chuck and again measuring the runout. This process is repeated until the prism is centered within tolerance. Next, adhesive is applied to the end face of the prism adjacent to the rotor. The latter is held centered (by its shaft) in the lathe's stock. The stock is then moved forward until contact is made between the rotor and the prism is made. After the adhesive is cured, the assembly is released. This method tends to be cumbersome and time-consuming, and is thus unattractive for producing a large number of prism/rotor assemblies.

SUMMARY OF THE INVENTION

In accordance with the invention, polyhedral workpieces having at least three plane sides substantially parallel to a central axis are aligned in an alignment tool having two sets of urging members biased in opposite directions to urge the workpiece into axial alignment with the central axis of the alignment tool.

According to one embodiment of the invention, the alignment tool includes a mounting surface adapted for mounting a fixture, the fixture adapted for holding a second workpiece in contact with one end of the polyhedral workpiece for the purpose of assembly of the two workpieces.

In another embodiment, an assembly tool is provided having first and second fixtures, the first fixture for holding the aligning tool with the first workpiece and the second fixture for holding the second workpiece, at least one of the first and second fixtures moveably mounted with respect to one another for moving the two workpieces along their aligned central axes into contact for assembly.

In accordance with another aspect of the invention, a method of joining the workpieces is provided, including the steps of:

a. aligning the central axis of the first workpiece with a reference central axis by urging the first workpiece into alignment by means of two sets of urging members positioned to exert balanced urging forces against opposing sides of the first workpiece, the two sets of urging members displaced from one another along the central axis of the workpiece and exerting the urging forces in opposite directions transverse to the central axis of the workpiece;

b. aligning the central axis of the second workpiece with the reference central axis; and c. bringing the two workpieces into contact for assembly.

In a prefered embodiment, the workpieces are joined with a radiation-curable adhesive layer, either or both of the workpieces are optically transparent, and light is directed through either or both of the workpieces to the adhesive layer to promote curing of the adhesive.

The align-and-assemble method and tools of the invention enable centering and assembly of a polyhedral workpiece with another workpiece, regardless of geometrical imperfections, in much less time than that needed presently for the adjust-measure-repeat method. Use of a fast curing adhesive, such as a UV-initiated or UV and heat curable adhesive to join the workpieces can further reduce processing time.

DETAILED DESCRIPTION OF THE INVENTION

Figure 1A:
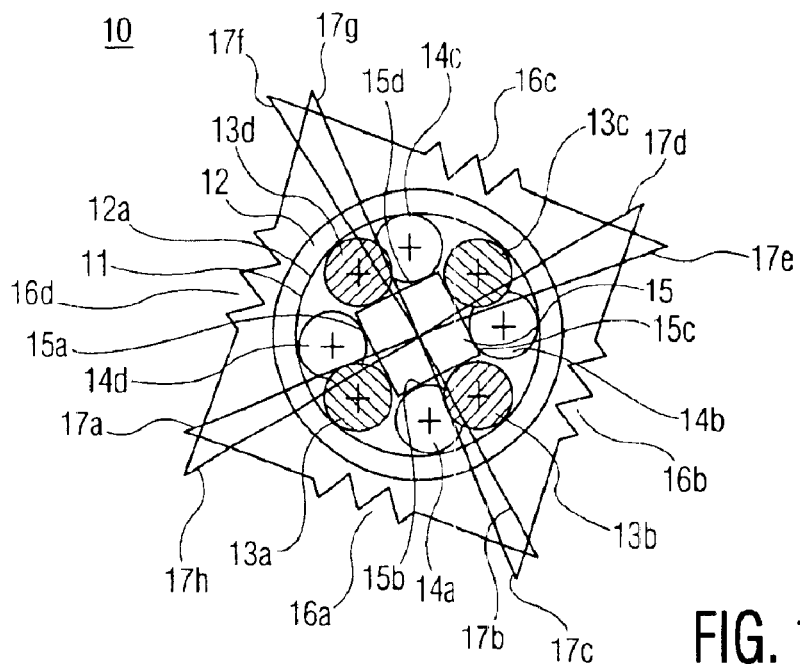
FIG. 1A is a schematic view along the central axis of a cylindrical alignment tool of the invention, showing the relationship between two sets of oppositely-biased aligning spheres of the tool and a plane-sided workpiece (prism) of nominally square cross-section.

Referring now to FIG. 1, a view along the central axis A of one embodiment of an alignment tool 10 of the invention, an alignment chamber 11 defined by a cylindrical wall 12 contains two sets 13 and 14 of spherical urging members 13*a* through 13*d* and 14*a* through 14*d*, respectively. These urging members 13 and 14 are all of approximately equal size and all contact both the inner surface 12a of wall 12 and one side of a four-sided prism 15. As will be appreciated, the more accurate the dimensions of inner surface 14a of chamber 14 and the urging members 13 and 14, the more accurate will be the alignment of the central axis W of workpiece 15 to central axis A of alignment tool 10.

Figure 2:
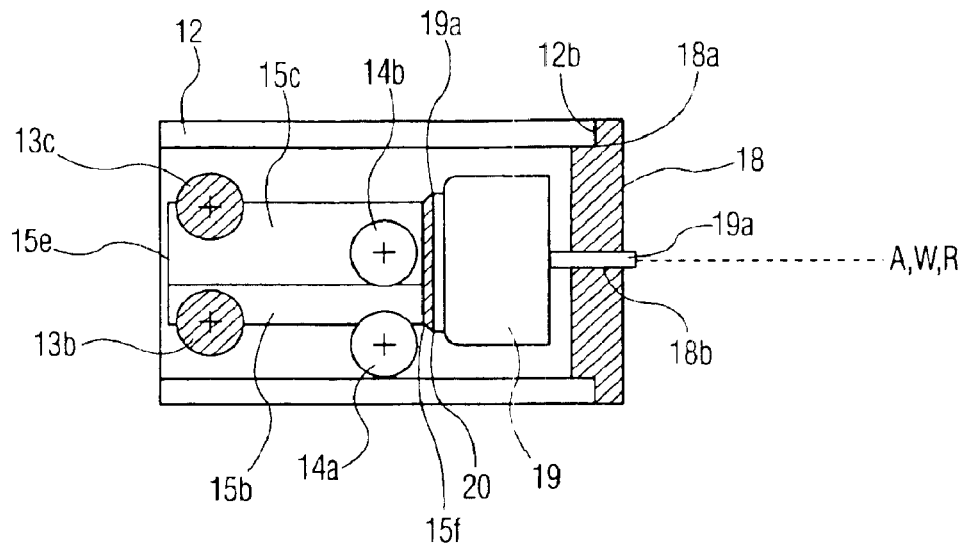
FIG. 2 is a side view of an assembly tool of the invention, including the alignment tool of FIG. 1, and a mating fixture holding a second workpiece (rotor) in contact with the prism via a glue layer.
Figure 4:
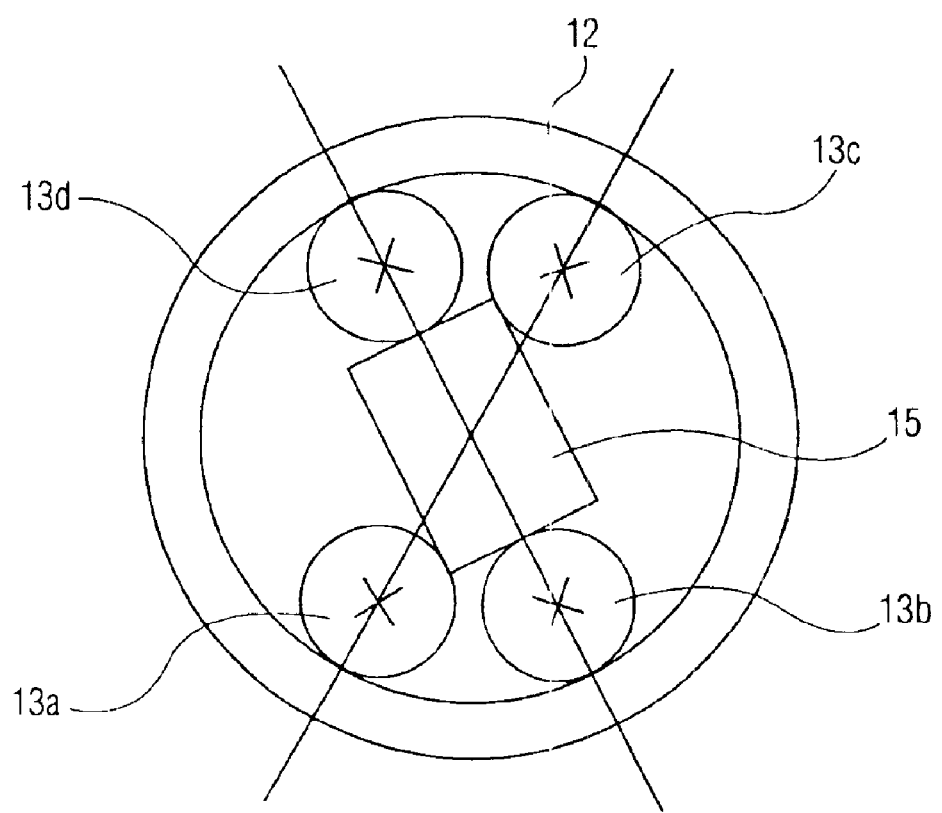
FIG. 4 is a view similar to that of FIG. 1, showing the relationship between one set of aligning spheres and a prism of rectangular cross-section.

As best seen in the side view of FIG. 2, the two sets of urging members 13 and 14 are displaced from one another along the central axis W of workpiece 15. Alignment of workpiece 15 is realized by biasing the two sets of urging members 13 and 14 in opposing directions transverse to the central axis W. Such biasing is achieved by means of springs, which push the spheres, through levers, against the sides of the prism 15, forcing it to the center of the chamber 11. Since the centering happens independently in two different locations, as shown in FIG. 2, the prism 15 will be centered along its entire length, even though it may have a rectangular cross-section, as shown in FIG. 4, or be tapered along its length.

Figure 1B:
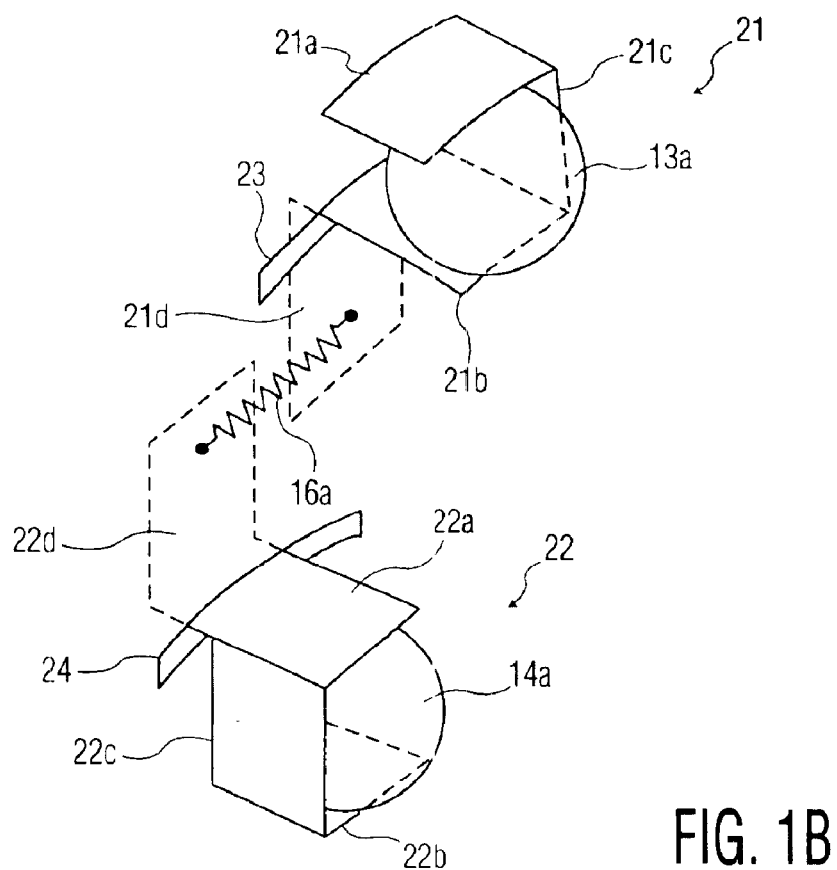
FIG. 1B is a detailed perspective view of the biasing arrangement for a pair of oppositely biased spheres from different sets.

FIG. 1A shows one embodiment of a biasing arrangement in which a set of four springs 16a through 16d and eight levers represented by lines 17a through 17h, bias both sets of spheres 13 and 14. FIG. 1B is a schematic perspective view showing the biasing arrangement for two of the spheres 13a and 14a. Each sphere is retained in a cage, each cage (21, 22) having a top (21a, 22a), bottom (21b, 22b) and side (21c, 22c). The bottom 21b of cage 21 and the top 22a of cage 22 extend through slots (23, 24) in wall 12, and then bend downward and upward, repsectively, to form brackets (21d, 22d). Spring 16a is attached to brackets 21d and 22d, resulting in a biasing force on sides 21c and 22c, which act as levers corresponding to lines 17a and 17b. This arrangement results in a bias of equal and opposite force on spheres 13a and 14a against sides 15a and 15b of prism 15, respectively.

FIG. 2 shows one embodiment of an assembly tool which is achieved by mounting a fixture 18 onto one end of wall 12. Fixture 18 has an indented ledge 18a dimensioned to fit snugly against mounting rim 12b of wall 12. Fixture 18 has a through hole 18b aligned with central axis A and dimensioned to accept spindle 19a of a second workpiece, rotor 19. Since rotor 19 has a central axis R running through the center of spindle 19, mounting of the fixture results in alignment of axes A, W and R.

Mounting of the fixture 18 at one end of alignment chamber 11 brings mounting surface 19b of rotor 19 into close proximity to mounting surface 15f of prism 15. Moving prism 15 slightly toward rotor 19 closes the gap and brings it into contact with glue layer 20. Preferably, glue layer 20 is of a UV-curable adhesive, and curing is achieved by introducing a UV beam at surface 15e of prism 15. The beam is then transmitted by total internal reflection from sides 15a through 15d and then through surface 15f to glue layer 20.

Preferably, a dual cure adhesive (ie, UV and heat curable) is used. This enables a short exposure in the alignment tool, followed by a full heat (and/or UV) cure in an oven. The latter cure can be a batch process, thus requiring minimal handling.

Figure 3:
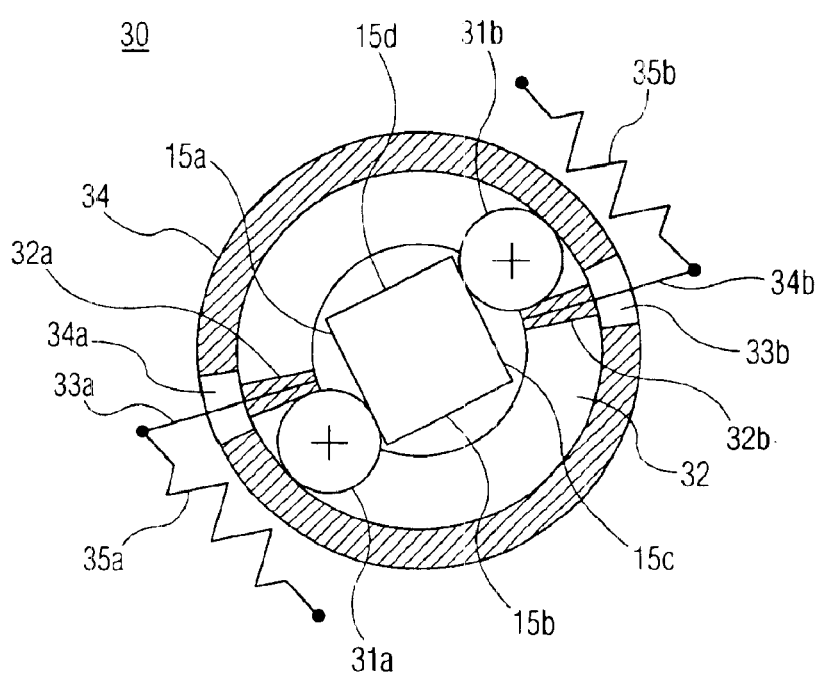
FIG. 3 is a section view along the central axis of another embodiment of the alignment tool of FIG. 1, showing diametrically opposed aligning spheres maintained in position by a ribbed cage.

FIG. 3 shows another embodiment of a biasing arrangement for an alignment tool 30 of the invention. In this arrangement, only two spheres (31a, 31b) are employed in each set. These spheres 31a and 31b are kept in diametrically opposed relationship by a rotatable cage 32 having ribs 32a and 32b, attached to levers 33a and 33b, which extend through apertures 34a and 34b of wall 34 and are attached to springs 34a and 34b. Ribs 32a and 32b bear against the sides of the spheres through the biasing action of the springs.

The arrangement of FIG. 3 of opposing spheres can be employed for any polyhedral workpiece having an even number of sides, so long as the opposing forces are balanced. For example, three spheres in each set may be used for a hexahedral workpiece and four spheres in each set for an octahedral workpiece.

Figure 5:
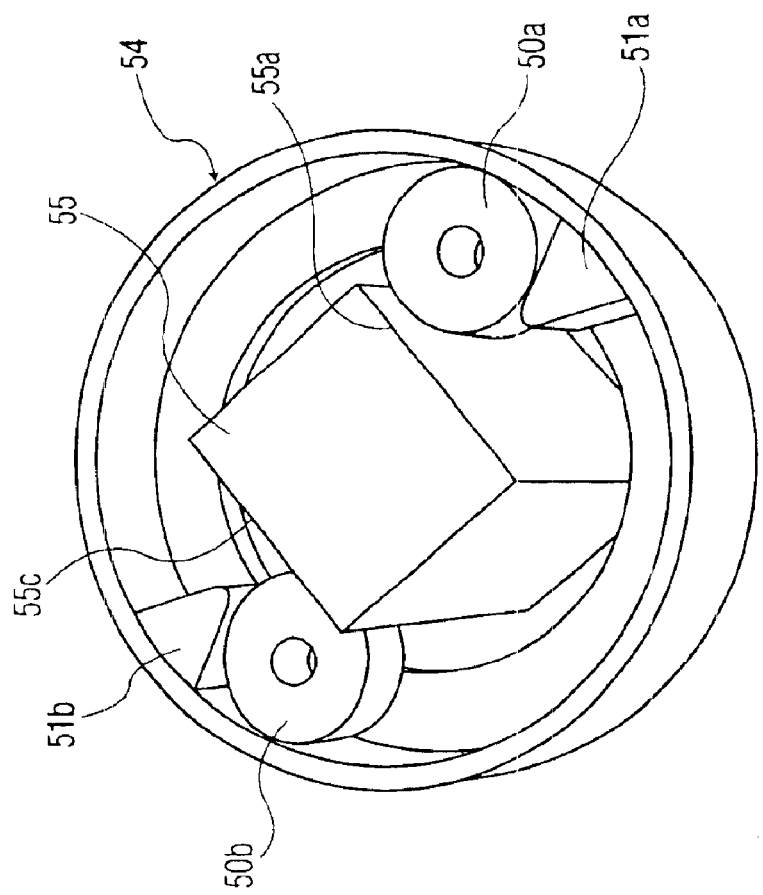
FIG. 5 is a perspective view of a cage similar to that shown in FIG. 3, in which the aligning spheres have been replaced by cylindrically-shaped members.

The urging members need not be spheres, so long as they have a circular cross-section transverse to the central axis of the tool. FIG. 5 shows a set of cylindrically-shaped urging members 50a and 50b, urged against sides 15a and 15c of prism 15 by ribs 51a and 51b of cage 52.

Figure 6:
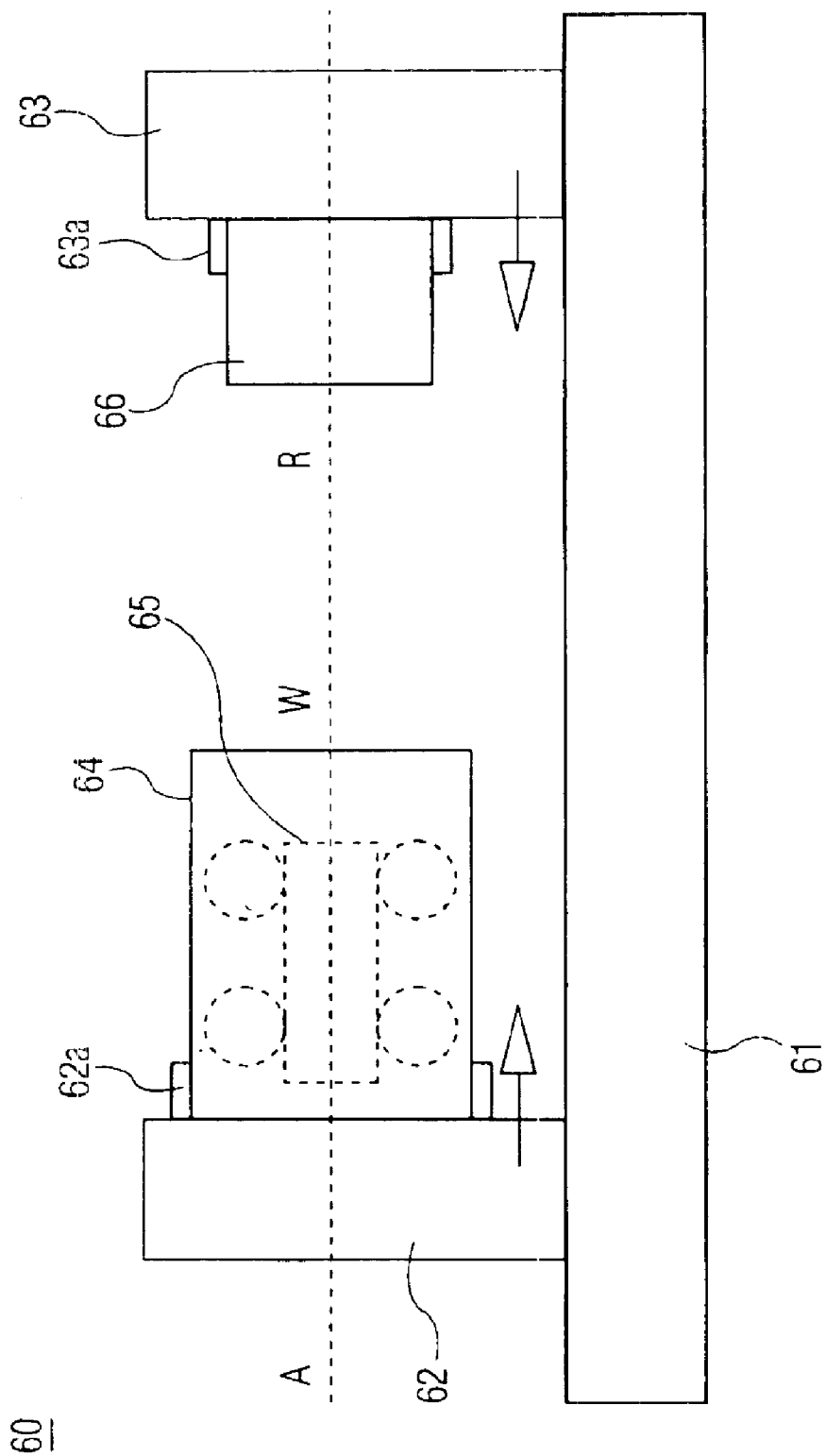
FIG. 6 is a schematic elevation view of one embodiment of an assembly tool of the invention.

FIG. 6 illustrates schematically one embodiment of an assembly tool 60 of the invention. Slidably mounted on base 61 is a pair of opposing fixtures 62 and 63, each having a mounting chuck (62a, 63a) precisely aligned with a central axis A. When alignment tool 64 is mounted on fixture 62, previously aligned workpiece 65 has its central axis W aligned with central axis A. At the opposite end of the base 61, mounting of a second workpiece 66 on fixture 63 using chuck 63a results in its central axis R being aligned with central axis A. The two fixtures 62 and 63 are mounted on base 61 to slide longitudinally parallel to the central axis A, thus enabling the two workpieces to be brought together for assembly while maintaining their mutual alignment.

The invention has necessarily been described in terms of a limited number of embodiments. From this description, other embodiments and variations of embodiments will become apparent to those skilled in the art, and are intended to be fully encompassed within the scope of the invention and the appended claims.

What is claimed is:

1. An alignment tool for aligning a polyhedral workpiece having at least three plane sides parallel to a central axis and two ends transverse to the central axis, the alignment tool also having a central axis and comprising at least first and second sets of urging members biased in opposite directions, for urging the workpiece central axis into alignment with the central axis of the alignment tool, the first and second set of urging members displaced with respect to one another along the central axis of the alignment tool, each set of urging members having at least two opposed urging members for providing balanced urging forces on opposite sides of the workpiece.

2. The alignment tool of claim 1 in which the urging members have a circular cross-section in a direction transverse to the central axis of the alignment tool, the circumference of the circle defining a contact surface for making urging contact with a side of the workpiece.

3. The alignment tool of claim 2 in which the diameters of the circular cross-sections of the urging members are substantially equal.

4. The alignment tool of claim 2 in which the urging members are spheres.

5. The alignment tool of claim 3 in which the tool has an alignment chamber defined by a cylindrical wall parallel to the central axis of the tool and the urging members are retained within the chamber.

6. The alignment tool of claim 5 in which the first and second sets of urging members are retained by first and second partially rotatable cages positioned within the chamber, the cages biased to rotate around the central axis in opposite directions.

7. The alignment tool of claim 6 in which the cages include retainers for retaining the urging members in opposed relationship, and the cages are biased by springs, one end of each spring attached to the cylindrical wall and the other end attached to a retainer.

8. The alignment tool of claim 1 in which each set of urging members has one urging member for each side of the workpiece.

9. The alignment tool of claim 1 in which the tool has a mounting surface adapted for mounting a fixture, the fixture adapted for holding another workpiece in contact with one end of the polyhedral workpiece.

10. A method for aligning the central axis of a polyhedral workpiece to a reference axis, the workpiece having at least three plane sides parallel to its central axis, the method comprising urging the workpiece into alignment by means of two sets of urging members positioned to exert balanced urging forces against opposing sides of the workpiece, the two sets of urging members displaced from one another along the central axis of the workpiece and exerting urging forces in opposite directions transverse to the central axis of the workpiece.

11. The method of claim 10 in which the workpiece has four sides and each set of urging members has four urging members.

12. The method of claim 11 in which the urging members have approximately equal circular cross sections.

13. The method of claim 12 in which the urging members are spheres.

* * * * *